(12) United States Patent
Tiernan et al.

(10) Patent No.: US 6,172,988 B1
(45) Date of Patent: Jan. 9, 2001

(54) METHOD FOR UNIVERSAL MESSAGING AND MULTIPLEXING OF VIDEO, AUDIO, AND DATA STREAMS

(75) Inventors: James C. Tiernan, Solana Beach; Christopher J. Bennett, San Diego, both of CA (US)

(73) Assignee: Tiernan Communications, Inc., San Diego, CA (US)

( * ) Notice: Under 35 U.S.C. 154(b), the term of this patent shall be extended for 0 days.

(21) Appl. No.: 08/675,558

(22) Filed: Jul. 3, 1996

Related U.S. Application Data
(60) Provisional application No. 60/010,873, filed on Jan. 31, 1996, and provisional application No. 60/016,194, filed on Apr. 25, 1996.

(51) Int. Cl.[7] .................................................. H04J 3/24
(52) U.S. Cl. ............................................ 370/473; 370/465
(58) Field of Search ............................... 370/366, 474, 370/469, 467, 535, 536, 537, 395, 389, 396, 517, 538, 397, 473, 353, 419, 465, 466, 498, 539, 541; 348/461, 467

(56) References Cited

U.S. PATENT DOCUMENTS

| | | | |
|---|---|---|---|
| 4,933,934 | * 6/1990 | Aikoh et al. | 370/539 |
| 5,319,707 | 6/1994 | Wasilewski et al. | 380/14 |
| 5,381,181 | 1/1995 | Deiss | 348/423 |
| 5,400,347 | * 3/1995 | Lee | 371/37.5 |
| 5,400,401 | 3/1995 | Wasilewski et al. | 380/9 |
| 5,420,866 | 5/1995 | Wasilewski | 370/110.1 |

(List continued on next page.)

FOREIGN PATENT DOCUMENTS

| | | |
|---|---|---|
| 0676756 | 10/1995 | (EP) . |
| 0737975 | 10/1996 | (EP) . |
| 0753954 | 1/1997 | (EP) . |
| 96/37999 | 11/1996 | (WO) . |

OTHER PUBLICATIONS

Tiernan, J. C., and Wechselberger, T., "Description of a Universal Packet Multiplex Transport for the Transmission for Broadcast Applications of Digital Services, including Video, Audio, and Data Programs," Technical Proposal, International Organization for Standarization Organization Internationale de Normalization, pp. 1–14 (Jan. 9, 1993).

"Implementation Guidelines for the Use of MPEG-2 Systems, Video and Audio in Satellite and Cable Broadcasting Applications in Europe, DVB–TS (Geneva)" pp. 1–14 (Jun., 1994).

"Guidelines on Implementation and Usage of Service Information," TM1324 Rev. 1, Final Draft, pp. 1–30 (Mar. 17, 1995).

"Information Technology—Generic Coding of Moving Pictures and Associated Audio Information—Part 1: Systems", Draft International Standard ISO/IEC DIS 13818-1, pp. x–xix, 10–11, 36–47, 64–65, 86–95, 106–113 (1995).

(List continued on next page.)

*Primary Examiner*—Douglas W. Olms
*Assistant Examiner*—Phirin Sam
(74) *Attorney, Agent, or Firm*—Hamilton, Brook, Smith & Reynolds, PC

(57) ABSTRACT

A method is disclosed for supplying arbitrary types of information in a digital signal conformant to the structures defined in ISO standard ISO/IEC 13818-1, known generally as MPEG2 Systems. The method extends Program Stream and Transport Stream structures by application of principles developed for standardization of bidirectional data communications protocols to define a universal messaging syntax applicable to all types of information, including Internet data streams, VBI data streams, other types of data streams, as well as MPEG2 video, audio, and control; to define a multiplexing structure that is independent of the details of the MPEG2 signal structure; and to define a scheme for addressing such enhanced MPEG2 signals, or portions of signals, to individual decoders or to groups of decoders.

40 Claims, 6 Drawing Sheets

U.S. PATENT DOCUMENTS

| | | | |
|---|---|---|---|
| 5,425,101 | 6/1995 | Woo et al. | 380/23 |
| 5,455,684 | 10/1995 | Fujinami et al. | 358/335 |
| 5,459,722 * | 10/1995 | Sherif | 370/395 |
| 5,467,342 * | 11/1995 | Logston et al. | 370/253 |
| 5,521,927 * | 5/1996 | Kim et al. | 370/474 |
| 5,533,021 * | 7/1996 | Branstad et al. | 370/396 |
| 5,537,408 * | 7/1996 | Branstad et al. | 370/518 |
| 5,544,161 | 8/1996 | Bigham et al. | 370/58.1 |
| 5,579,317 * | 11/1996 | Pang et al. | 370/392 |
| 5,583,863 * | 12/1996 | Darr, Jr. et al. | 370/397 |
| 5,598,228 * | 1/1997 | Saitoh | 348/732 |
| 5,598,415 * | 1/1997 | Nuber et al. | 370/474 |
| 5,619,337 * | 4/1997 | Naimpally | 386/83 |
| 5,625,693 * | 4/1997 | Rohatgi et al. | 713/187 |
| 5,627,836 * | 5/1997 | Conoscenti et al. | 370/397 |
| 5,650,825 * | 7/1997 | Naimpally et al. | 348/465 |
| 5,703,877 * | 12/1997 | Nuber et al. | 370/395 |
| 5,712,850 * | 1/1998 | Elia et al. | 370/538 |
| 5,726,989 * | 3/1998 | Dokic | 370/509 |
| 5,801,781 * | 9/1998 | Hiroshima et al. | 370/474 |
| 5,805,762 * | 9/1998 | Boyce et al. | 386/68 |
| 5,832,256 * | 11/1998 | Kim | 395/559 |
| 5,844,600 * | 12/1998 | Kerr | 370/260 |
| 5,845,089 * | 12/1998 | Ohira et al. | 370/352 |
| 5,896,388 * | 4/1999 | Earnest | 370/395 |
| 5,987,212 * | 11/1999 | Kim et al. | 386/68 |

OTHER PUBLICATIONS

"Digital Broadcasting Systems for Television, Sound and Data Services; Specification for Service Information (SI) in Digital Video Broadcasting (DVB) Systems," European Telecommunication Standard, prETS 300 468, pp. 1–62 (Oct., 1994).

"Information Technology—Generic Coding of Moving Pictures and Associated Audio: Systems Recommendation H.222.0,", ISO/IEC 13818–1, International Organization for Standardization Organization Internationale de Normalization, pp. 1–146 (Nov. 13, 1994).

* cited by examiner

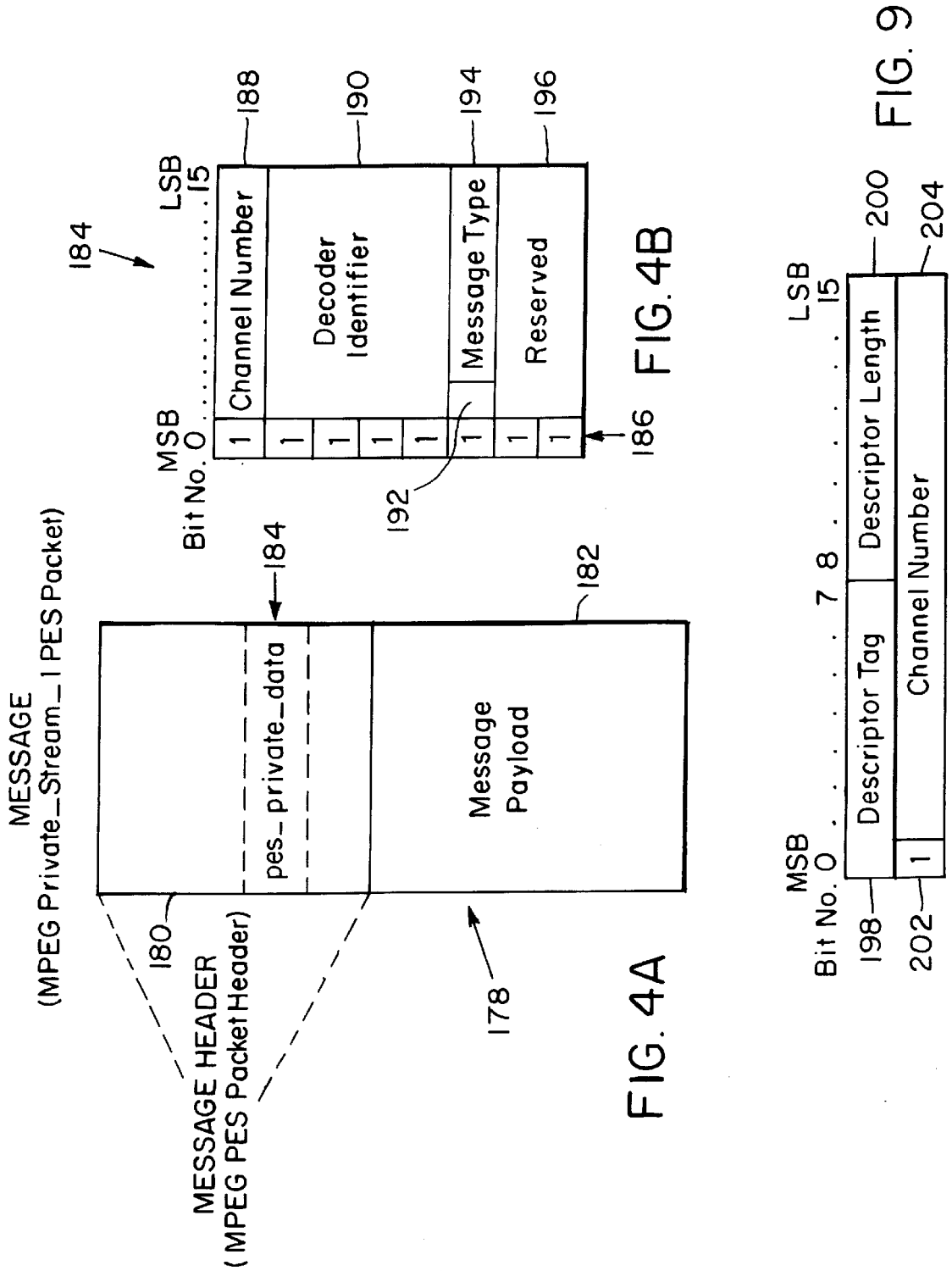

METHOD FOR UNIVERSAL MESSAGING AND MULTIPLEXING OF VIDEO, AUDIO, AND DATA STREAMS

RELATED APPLICATIONS

This application claims priority to U.S. Provisional Application, Serial No. 60/010,873, filed Jan. 31, 1996 and U.S. Provisional Application Serial No. 60/016,194, filed Apr. 25, 1996, both entitled "A Universal Messaging and Multiplexing System Compatible With MPEG2 Digital Video and Audio Transmissions," by James C. Tiernan and Christopher J. Bennett, and claims the benefit thereof.

BACKGROUND OF THE INVENTION

The invention relates generally to the transmission of digital signals, and more particularly to the transmission of digital signals in systems containing digital video and audio signals conforming to packet-based multiplexed communication standards.

The International Organization for Standardization (ISO) recently adopted a standard (ISO/IEC 13818-1) that addresses the combining of one or more "elementary streams" of video and audio, as well as other data, into single or multiple streams suitable for storage or transmission. The ISO/IEC 13818-1 standard, hereinafter referred to as the "MPEG2 Systems" standard, is described in detail in the ISO draft document "Generic Coding of Moving Pictures and Associated Audio", ISO/IEC JTC1/SC29/WG11 N0801 (Nov. 13, 1994), which is incorporated herein in its entirety by reference. The MPEG2 Systems standard specifies syntactical and semantic rules for system level coding of the elementary streams using packet-oriented multiplexes. The MPEG2 Systems standard defines an individual coded video, audio or other coded bitstream as an "elementary stream". The contents of an elementary stream may be broken into a sequence of discrete units, in which case the elementary stream is structured as a Packetized Elementary Stream (PES). The individual units, or packets, are known as PES packets, which can be of large and variable size. The MPEG2 Systems standard defines generic structures for PES packet formats and specifies particular rules for creating PESs from digital video and audio elementary streams. Allowance is made for creating PESs for private data formats, i.e., data formats not defined by the MPEG2 Systems standard.

The MPEG2 Systems standard defines two methods of creating a multiplex of PESs. In a Program Stream (PS), all components in the multiplex are assumed to belong to a single "Program", that is, a collection of elementary streams which may sensibly be presented as a unity to a user, all components being referenced to a common time base, together with certain coordinating control information. PES packets from component PESs are multiplexed by PES packet. The PS is rigidly structured so that at most one PES of a specified format may carry a private data elementary stream.

In a Transport Stream (TS), the components of the multiplex may belong to many programs. Each PES is assigned a "packet identifier" (PID). The PES packets are broken into small, fixed-size units called transport packets, which may be multiplexed with transport packets from other PESs. Coordination and control of the PESs and the Programs in the TS is managed via control data called Program Specific Information (PSI). PSI is structured according to a section format which differs from and is incompatible with the PES packet. PSI is distributed via several PIDs, including a base PID (PID 0), used to carry a Program Association Table (PAT) listing all Programs in the TS, and a PID associated with each Program which carries a Program Map Table (PMT) describing the components of the Program. PSI syntax also permits the use of PIDs to transport private data in formats compatible with PSI, or in totally private formats. Other private control information may include Entitlement Control Messages (ECMs) or Entitlement Management Messages (EMMs) used for encryption and authorization, generally referred to as Conditional Access Information. In addition, the Digital Video Broadcasting (DVB) committee has defined a similar structure for transport of Service Information (SI).

Private data signals can cover a wide variety of purposes, including signals strictly related to broadcast television applications, such as would be carried in the Vertical Blanking Interval (VBI) of an analog television signal; signals carrying services ancillary to broadcast television applications, such as Electronic Program Guides (EPG); and signals such as are used for transmitting voice and/or data in conventional telecommunications networks, in both asynchronous and synchronous modes.

It is apparent that the MPEG2 structures suffer from certain difficulties. One class of difficulty emerges when one considers the possibility of building modular encoders and decoders that could be applicable to both TSs and PSs.

In practice, however, there are significant restrictions on such an approach. In the first instance, the treatment of control data is very different between the PS and the TS. While the control data used to describe a Program in a PS is in a PES format, the control data used in a TS is in an incompatible section format. Thus, the interfaces between modules must necessarily be different for PS and TS encoders. This difficulty also prevents storage of a Program in a form suitable for direct inclusion in a TS on a device adapted to the PS format.

Another significant concern is that the PS structure imposes restrictions on the types and numbers of program elements, or components, which may be part of a Program. Such restrictions do not exist in the TS structure. As an example, a Program may contain multiple streams of subtitling information that are encoded according to International Radio Consultative Committee (CCIR) System B Teletext specifications. Each stream of subtitling information may be encoded as a PES according to the procedures defined by the Digital Video Broadcasting (DVB) committee in DVB TM1398 "DVB Subtitling System Working Draft 1.0". Within the TS structure, each such PES of subtitling information may be assigned a separate PID and may be associated with the Program. However, the PES structure is a Private Data PES, and the PS specifications only allow one such PES to be associated with a Program.

A second class of difficulty emerges when one considers the variations in the number of components that may be associated with a Program, and the variation in their data rates. The Main Profile Main Level of the MPEG2 Systems standard permits video elementary streams to be transmitted at rates of between 1 and 15 Mbps. A TS may include multiple such streams. A decoding device which selects such streams from the TS by PID will therefore typically be implemented in high speed field-programmable gate arrays (FPGAs) or application-specific integrated circuits (ASICs) in which the PID is held in a register for comparison purposes. The number of PIDs which may be processed simultaneously therefore becomes a controlling cost element in the design of such FPGAs or ASICs. However, since each PID corresponds to a single PES, the same register is used regardless of whether the component selected is a 15 Mbps video stream or a 1200 bps asynchronous data component. The MPEG2 Systems standard scheme of making each PID carry a single component can therefore induce significant inefficiencies.

A third class of difficulty emerges when one considers certain classes of application for which addressability is desirable. For example, it may be desired to address certain streams, including video and audio streams, to a decoder or a group of decoders. This need may exist without regard to the capabilities that may exist for such services in the underlying transmission media, for example because no such facilities exist in the medium. For a further example, it may be desired to transmit data signals such as datagrams conforming to the Internet Protocol (IP) in a private data channel over an MPEG2 Transport Stream. However, a decoder capable of accepting such datagrams must first be provided with an IP address. In other broadcast systems faced with this problem, such as Ethernet, the decoder is provided with a native address by a manufacturer which may be bound to an Internet address by the systems administrator using protocols such as the Reverse Address Resolution Protocol (RARP). Such an approach is not possible in MPEG2 Systems because no such native address scheme is defined for MPEG2 decoders.

SUMMARY OF THE INVENTION

One object of the present invention is to separate processing of elementary streams from the multiplexing and demultiplexing of such streams into a Transport Stream or Program Stream by a common interface based on a universal message structure that is compatible with the PES packet structure but does not share the limitations of the latter.

Another object is to multiplex multiple elementary streams into a format which permits the creation of Programs that are compatible with a Program Stream, and which permits the use of a single PID to identify multiple elementary streams in circumstances when such multiplexing creates significant efficiencies in use of PIDs in Transport Stream decoders.

A further object of the present invention is to address individual signals to individual decoders or groups of decoders, without regard to any addressing facilities that may exist in the underlying transmission medium.

In accordance with an aspect of the invention, a method of providing transport services to a plurality of first elementary streams comprises segmenting the elementary streams into messages to form a plurality of first message streams in which each message stream is associated with a particular elementary stream. The first message streams are converted into first packetized elementary streams. The first packetized elementary streams are multiplexed into an output stream. The output stream can be a Program Stream, a Transport Stream, or one of other types of streams including Asynchronous Transfer Mode.

According to another aspect of the invention, a plurality of second elementary streams are segmented into messages to form a plurality of second message streams. Data channel identifiers are associated with the second message streams, such that each data channel identifier is associated with a particular message stream. The second message streams are multiplexed into a second packetized elementary stream which is then multiplexed with the first packetized elementary streams into the output stream.

According to another aspect of the invention, for a Transport Stream, multiplexing the first and second packetized elementary streams is achieved by converting packetized elementary stream packets of certain packetized elementary streams into table sections and segmenting the sections and the remaining packetized elementary stream packets into Transport Stream packets. The Transport Stream packets are multiplexed to form the Transport Stream.

According to yet another aspect of the invention, the elementary streams can include elementary streams which have different data rates.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

FIGS. 4A and 4B illustrate the general content and arrangement of a message structure in accordance with the present invention.

FIG. 9 illustrates the format of private data descriptors for use in the message structure of FIGS. 4A and 4B in accordance with the present invention.

DESCRIPTION OF THE PREFERRED EMBODIMENT

Figure 1:
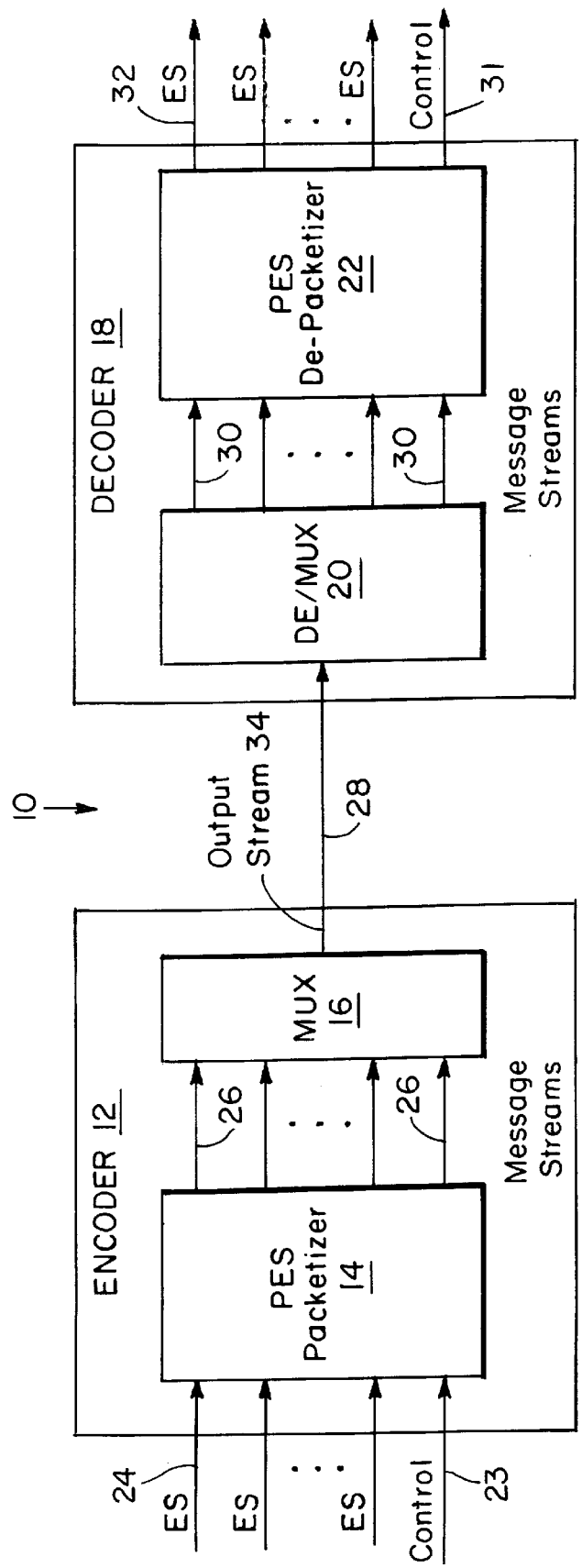
FIG. 1 is a schematic block diagram of an encoder/decoder system in accordance with the present invention.

The present invention provides for the adoption of the principles of protocol layering specified by the Open Systems Interconnection (OSI) Reference Model defined in standard ISO/IEC 7498 for use in systems providing MPEG2 PSs and TSs. The MPEG2 Systems protocol architecture is positioned at the Transport Layer of the OSI Reference Model. In the present invention, three sublayers are provided:

Segmentation sublayer. In this sublayer, an elementary stream Protocol Data Unit (PDU) is accepted across a Service Access Point (SAP) to the sublayer as a transport service Service Data Unit (SDU) and is segmented into units called Messages. A Message is a generalization of a PES Packet. The Messages can be optionally addressed. The Message is the segmentation sublayer PDU. For each elementary stream input to the segmentation sublayer, a single PES is created within the sublayer. The segmentation sublayer also permits the identification of Transport Service Connections between the input SAP and the output SAP, called Data Channels, by means of a channel identifier.

Multiplexing sublayer. In this sublayer, a set of input Data Channels may optionally be multiplexed into a single PES. Messages are both the PDUs and SDUs of the multiplexing sublayer.

Convergence sublayer. In this sublayer, the various PESs are multiplexed using a format specific to the transport system being used.

In the preferred embodiment, two variants of the convergence sublayer are defined to support the PS and TS defined by MPEG2. Additional convergence sublayers could be defined for other contexts, e.g., for transport of PESs using Asynchronous Transfer Mode (ATM). In the variant of the Convergence sublayer used for a PS, referred to as the PS Convergence sublayer, PES packets are multiplexed directly into a PS, as defined by the MPEG2 Systems standard. The variant of the Convergence sublayer used for a TS, referred to as the TS Convergence sublayer, is in turn comprised of three sublayers: a format convergence sublayer for converting certain PESs to the Table Section formats required by MPEG2 Systems for certain purposes, notably transport of PSI; an additional segmentation sublayer for segmenting PES packets into small, fixed size Transport Packets; and a multiplexing sublayer for multiplexing Transport Packets.

The present invention is based on the following principles:

1. Each elementary stream input to a transport service is output as an identical single elementary stream. The association between the input and output elementary streams defines a Data Channel. Each Data Channel uniquely identifies an association between the TSAP (Transport SAP) at the source and the TSAP at each decoder. Elementary streams may be freely associated with Data Channels.

2. The Transport Layer is decomposed into sublayers. The interfaces between the sublayers is based on the PES syntax defined by the MPEG2 Systems standard, since PES is the common element linking MPEG2 elementary streams with both the Transport Stream and Program Stream variants. An extension of the PES packet is used to transport all data types in the system in a Universal Messaging Structure referred to earlier as a Message. The Message also provides the structures required for addressability.

3. The syntax applying to the contents of a Message depends on the type of elementary stream. Each Message therefore is assigned a Message Type identifying the message syntax. The message type acts as a selector for the Presentation Layer Entity needed to process the message (e.g. video, audio, VBI).

To the extent that a message type is present in a Message, the Message is self-descriptive regarding the presentation layer processing that is required. Since it is possible in the future that PESs may be processed by transport services having a non-MPEG2 structure, such as ATM, and may even be processed in isolation from other elementary streams, Messages should be self-descriptive with respect to presentation layer parameters, where possible.

Referring now to FIG. 1, a packet-based communication system is shown which embodies the principles of the present invention. The system 10 includes an encoder 12 and a decoder 18 connected by a transmission path 28. The transmission path 28 can be any transmission facility, such as a fiber optic link or a satellite transmission uplink/downlink. Elementary streams 24 and control information 23 input to the encoder 12 are converted to a single output stream 34 and transmitted over path 28 to the decoder 18. The decoder 18 reconverts the output stream to the constituent elementary streams 32 and control information 31. The encoder 12 includes a Packetized Elementary Stream (PES) packetizer 14 and a multiplexer 16. The elementary streams 24 and control information 23 input to the PES packetizer are converted to PES streams 26. The multiplexer 16 multiplexes the PES streams to form the output stream 34.

The decoder 18 includes a demultiplexer 20 and a PES depacketizer 22. The demultiplexer 20 demultiplexes the output stream 34 to extract PES streams 30. The PES de-packetizer 22 converts the PES streams to the constituent elementary streams 32 and control information 31. The PES packetizer 14 and the PES de-packetizer 22 operate in accordance with the MPEG2 Systems standard. In preferred embodiments, the mux/demux 16, 20 operate with Transport Streams or Program Streams as the output stream 34. In an alternate embodiment, the multiplexer and demultiplexer 16, 20 can operate to provide non-MPEG streams, such as an ATM formatted stream for output stream 34.

Figure 2:
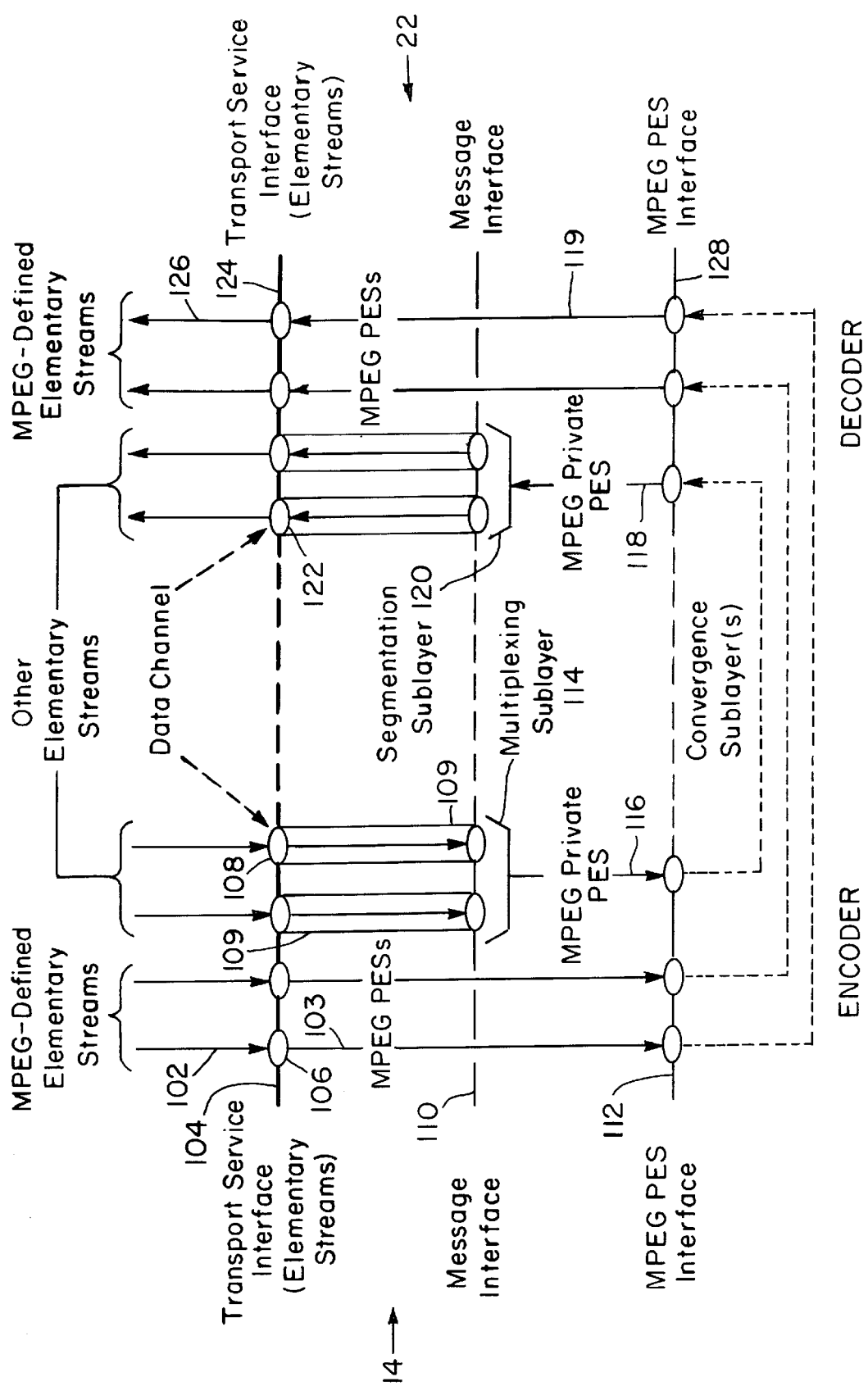
FIG. 2 is a flow diagram illustrating a transport layer in accordance with the present invention.

With reference to the concepts defined in ISO/IEC standard 7498, an MPEG2 encoder and decoder provides unidirectional broadcast transport services between the encoder and decoders. The transport services ensure transparent transport of elementary streams between the encoder and decoder. MPEG2 defines this process for video and audio elementary streams. FIG. 2 illustrates the generalized transport process embodied in the present invention.

In FIG. 2, the transport layer of ISO/IEC 7398 is used to provide unidirectional services only. The transport layer is decomposed into three sublayers in the encoder and decoder. FIG. 2 illustrates the first two of these sublayers only which correspond to functions performed by the PES packetizer 14 and PES de-packetizer 22 (FIG. 1). The encoding process is illustrated on the left side and the decoding process on the right side of FIG. 2.

In the encoding process, the input to the encoder is provided as one or more elementary streams 102. The structure of these elementary streams is defined elsewhere. The coding of certain types of elementary streams, notably video and audio, are defined by the MPEG2 video and audio standards specified in ITU-T Rec. H.262|ISO/IEC 13818-2 and ISO/IEC 13818-3. Each elementary stream is provided to the encoder across the transport service interface 104. The TSAP 106, 108 identifies the endpoint of a Data Channel.

Figure 3:
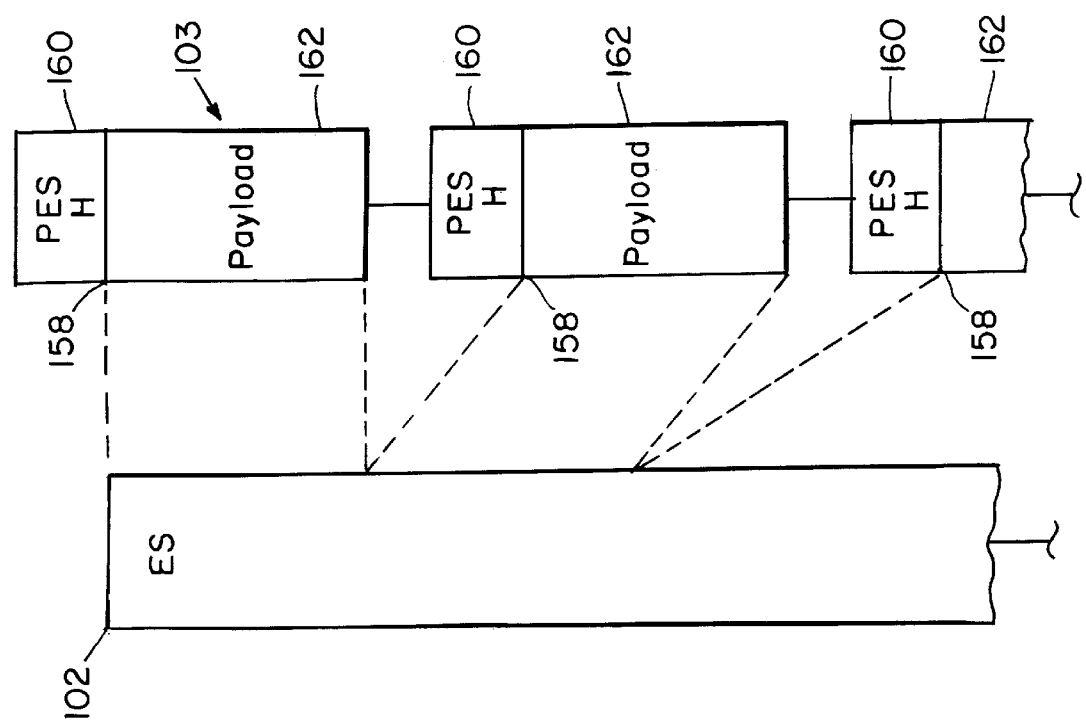
FIG. 3 illustrates a Message Stream conforming to the PES format defined by MPEG2.

The first sublayer of the transport layer is the segmentation sublayer. In the segmentation sublayer entity in the encoder, the contents of the elementary streams are processed and divided into Messages. The structure of the Message in the present invention is considered in further detail below. Each elementary stream is thereby converted into a Message Stream. Certain Message Streams 103, representing the content of Data Channels carrying elementary streams defined by MPEG2 are identical to MPEG2 PESs; the identity of the associated Data Channel is not explicitly preserved. FIG. 3 illustrates a Message Stream 103 as defined by MPEG2. An MPEG2-defined elementary stream 102, such as a compressed audio or video stream, is there shown segmented into Messages 158. Each message 158 includes a PES packet header 160 and payload 162 as defined for the PES packet structure in the MPEG2 standard.

Referring again to FIG. 2, in certain other Message Streams 109, representing the content of Data Channels carrying elementary streams not defined by MPEG2, the identity of the Data Channel may optionally be preserved by an identifier called a channel number which is stored in a field in the Message format. In FIG. 2, such Data Channels are shown with the identity of the Data Channel preserved. The Message Stream 109 comprises Messages having the structure illustrated in FIGS. 4A and 4B. A Message 178 includes a PES packet header 180 and a payload 182. The Message Header 180 conforms to an MPEG2-defined Private_Stream_1 PES Packet format which includes a pes_private_data field 184. The structure of Message Header 180 is described in further detail below. It should be noted that a Message can also be based on a Private_Stream_2 PES Packet format in which case private data forms the first part of the payload.

Figure 5:
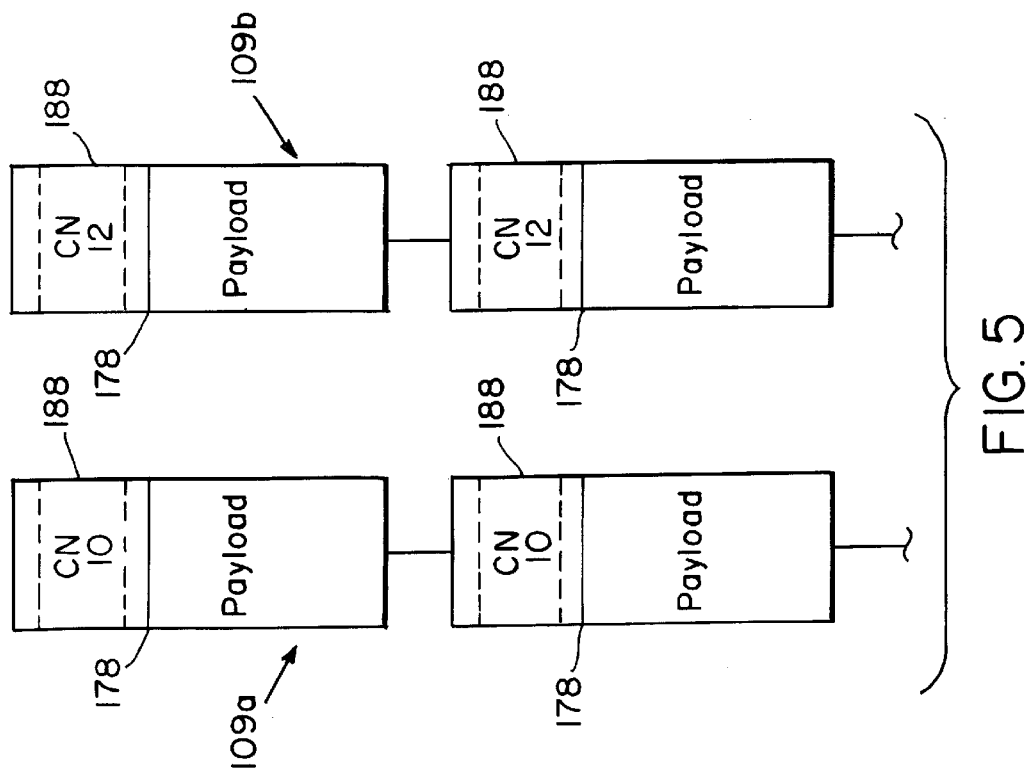
FIG. 5 illustrates Message Streams having a channel number in accordance with the present invention.

It is important at this point in the discussion to note that a channel number can be stored in the pes_private_data field 184. FIG. 5 illustrates Message Streams 109a, 109b having the Message structure 178. Each Message includes a channel number 188 unique to each Message Stream. Certain Messages Streams, and certain Messages within individual Message Streams, may be addressed at this point.

Figures 6, 8:
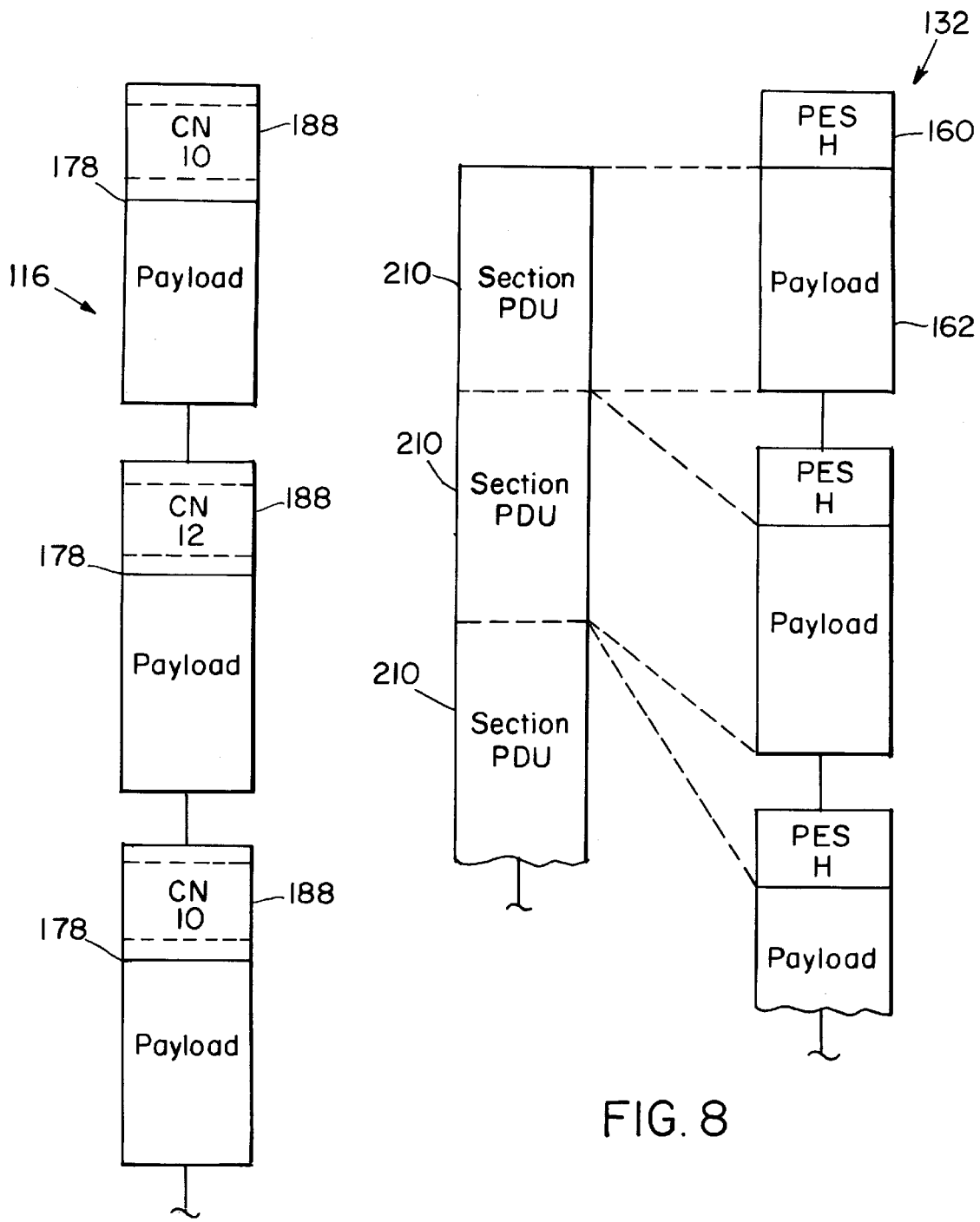
FIG. 6 illustrates a multiplex of Message Streams forming a Private PES in accordance with the invention.
FIG. 8 illustrates a Message Stream which includes section formatted information.

Referring again to FIG. 2, in the encoder, Messages are passed by the segmentation sublayer entity to the next sublayer, the Multiplexing sublayer, across the Message Interface 110. In this sublayer, all Message Streams are transformed into PESs by the Multiplexing sublayer entity. If the Messages in a given Message Stream do not retain the channel number, identifying their associated Data Channel, they cannot be multiplexed and are passed to the Convergence sublayer, as shown in 112. Optionally, as shown in 114, Messages from different Data Channels may be multiplexed into a single PES, conforming to the syntax of a Private PES 116 as defined by MPEG2, which is then passed to the Convergence sublayer. FIG. 6 illustrates the structure of the Private PES 116. The Private PES 116 is a stream of messages 178 multiplexed from Message Streams 109a and 109b. The messages 178 can be distinguished by the channel number 188.

In FIG. 2, Message Streams are shown being multiplexed into a unique MPEG2 private PES. Nothing in the present invention precludes the creation of multiple MPEG2 Private PES, unless constrained by the capabilities of the Convergence sublayer. The structure of Convergence sublayers are discussed in further detail below.

It will be understood that the interface between the Multiplexing sublayer and the Convergence sublayer at all times consists of an MPEG2 PES. This is not true for MPEG2 itself, which in particular defines a second class of interface, the so-called MPEG2 sections, for use of transport of control information and private data in an MPEG2 TS. It is a principal object and a feature of the present invention that the interface to the Convergence sublayer is at all times an MPEG2 PES, so that different Convergence sublayers may be substituted for each other, with the only impact upon the Segmentation and Multiplexing sublayers, if any, being an adjustment of the set of Data Channels which are multiplexed into a set of MPEG2 Private PESs.

It will also be understood that the data capacity of the MPEG2 Private PESs created in the Multiplexing sublayer of the encoder 116 will be approximately equal to the sum of the capacities of the individual Data Channels 108. In systems in which the transport service must carry a number of elementary streams of widely variant data rates, the invention may be used to aggregate a number of low-rate elementary streams into a single high-rate PES, thereby minimizing the resources required to identify the various low-rate data streams in ASIC or VLSI implementations of components of the decoder.

Each PES passed across the interface between the Multiplexing sublayer and the Convergence sublayer in the encoder 112 is recovered in the Convergence sublayer entity in the decoder and passed across the corresponding interface 128 to the Multiplexing sublayer entity in the decoder. If the PES transports an MPEG-defined elementary stream 119 then it is passed directly to the Segmentation sublayer in the decoder. If an MPEG2 Private PES 118 transports a multiplex of elementary streams created according to the present invention, as described above, then the multiplex is passed to a demultiplexer within the multiplexing sublayer entity of the decoder 120. Within the demultiplexer, the Data Channel 122 associated with each Message is identified, and the MPEG2 Private PES is decomposed into the constituent Message Streams. If these Message Streams are not addressed, or, to the extent that addressed Messages within these Message Streams are addressed to the decoder, either individually or as a member of a group of decoders, they are then reassembled into their corresponding elementary streams 126, which may be defined by MPEG2 or may be other elementary streams, and are passed across the transport service interface in the decoder 124.

Many convergence sublayers may be defined. In the present description of the preferred embodiment of the invention, only two are considered: the MPEG2 PS Convergence Sublayer and the MPEG2 TS Convergence sublayer. It will be understood that other Convergence Sublayers can be defined, e.g. for the transport of PESs over Asynchronous Transfer Mode (ATM).

The MPEG2 PS Convergence Sublayer causes a multiplex of PESs to be created which is a Program Stream conforming to the syntax defined by MPEG. This sublayer is completely defined by the MPEG2 specifications relating to the creation of Program Streams within the MPEG2 Systems standard, and need not be further discussed here. It will be understood that the services of the multiplexing sublayer defined above permit many data streams to-be combined into a single MPEG2 Private PES. Since the MPEG2 PS only permits the presence of two Private PESs, each of a different defined PES structure, it is an advantage of the present invention that a PS created using it can carry many more data streams than a PS defined by MPEG2. For example, this facility can be used to transport teletext, closed captioning, test and reference signals intended for output in the VBI as well as any number of synchronous or asynchronous data streams in a PS, while the structure defined by MPEG2 permits the transport of at most one of these in a Private PES of type Private_stream_1 or Private_stream_2.

The MPEG2 TS Convergence Sublayer causes a multiplex of PESs to be created which is a Transport Stream conforming to the syntax defined by MPEG2. It is apparent that the interface defined by the present invention between the Multiplexing sublayer and any Convergence sublayer is the PES structure defined by MPEG2. The rules defining the creation of Transport Streams within the MPEG2 Systems standard completely cover the procedures required to create a TS from a set of input PESs, and need not be further discussed here. However, it is also necessary for the MPEG2 TS Convergence Sublayer to convert certain input PESs into the format expected within a TS, specifically to extract MPEG2 PSI, DVB SI, and private sections such as ECMs and EMMs which are defined in formats specific to the TS.

Figure 7:
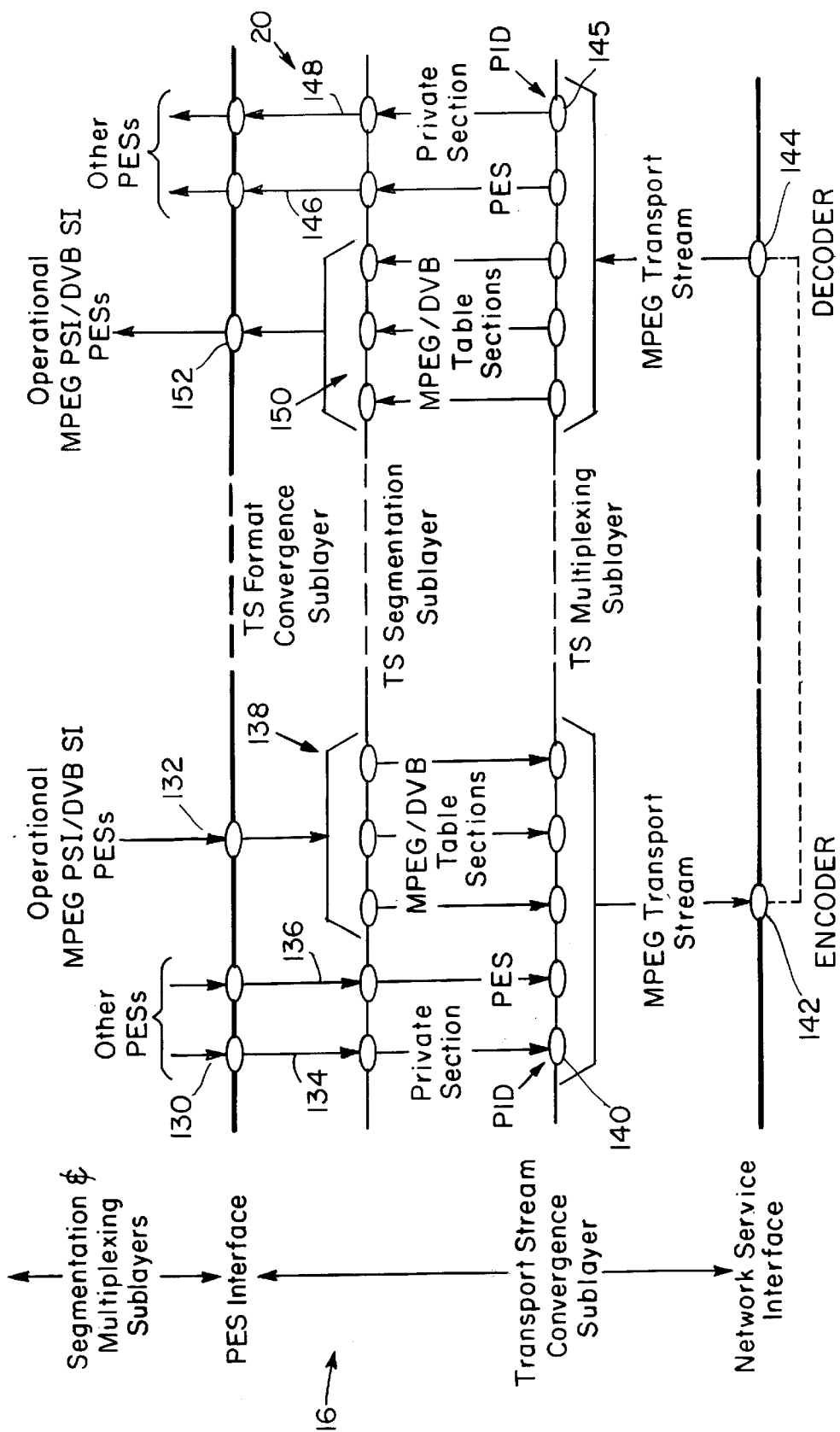
FIG. 7 is a flow diagram illustrating a Transport Stream convergence sublayer in accordance with the present invention for use in the transport layer of FIG. 2.

The structure of the Transport Stream Convergence Sublayer is shown in FIG. 7. The processes performed in an encoder are shown on the left hand side of the figure. The processes performed in the decoder are shown on the right hand side of the figure. These processes generally correspond to the functions performed by the mux/demux 16 and 20 respectively (FIG. 1).

The TS Convergence Sublayer is itself constructed of three sublayers: the TS Format Convergence Sublayer, the TS Segmentation Sublayer, and the TS Multiplexing Sublayer. In the encoder, the TS Format Convergence Sublayer is responsible for transforming PES packets received from the Multiplexing sublayer into the formats (PES packets or sections) expected in the MPEG2 Transport Stream. In certain instances, the TS Format Convergence Sublayer may also demultiplex an input PES into multiple streams whose separate identity is required by the MPEG2 TS structure, by DVB, or by third parties. The TS Segmentation Sublayer is responsible for segmenting the input streams into fixed size Transport Stream packets of 188 bytes. The TS Multiplexing Sublayer is responsible for combining the TS packets in the several input streams into a single TS.

The functions of the TS Segmentation Sublayer and the TS Multiplexing Sublayer are fully defined by those sections of the MPEG2 System specifications defining the structure of a TS, and will only be briefly considered here. The TS Format Convergence Sublayer is a feature of the present invention.

With reference to FIG. 7, the functions of the TS Convergence Sublayer in the encoder will now be described. All PESs created by the Multiplexing Sublayer are passed to the TS Format Convergence Sublayer. For purposes of managing and control the TS, at least one PES 132 consists of Messages comprising the MPEG2 PSI for the TS, and, if appropriate, at least one PES 132 consists of Messages comprising the DVB SI for the TS. Other PESs 130 includes any PES other than the PESs 132 which convey MPEG2 PSI or DVB SI intended for use in the current Transport Stream. The PESs 130 include MPEG-defined PESs as well as other private PESs.

The PES 132 are illustrated in FIG. 8. The PES 132 there shown includes a PES packet header 160 and payload 162 as defined for the PES packet structure in the-MPEG2 standard. The PES 132 is formed in the segmentation sublayer from an elementary stream which comprises a number of section PDUs 210. Each section PDU 210 is encapsulated into a Message payload 162. The same process can be used to convert Internet Protocol datagrams into Messages.

A PES in which the PES packet structure may be preserved intact within the TS 136 is passed without processing to the TS Segmentation Sublayer wherein the PES packets are segmented into multiple Transport Packets as defined by the MPEG2 Systems standard. A PES which contains data which is intended for transport as MPEG2 Private Sections 134 is processed within the TS Format Convergence Sublayer such that the MPEG2 Private Sections are extracted from the PES Packets and are passed to the TS Segmentation Sublayer wherein the Private Sections are segmented into multiple Transport Packets as defined by the MPEG2 Systems standard. In each case, the sequence of Transport Packets created from the PES or the stream of private sections are assigned a PID 140 for purposes of multiplexing within the TS Multiplexing Sublayer using the procedures specified by the MPEG2 Systems standard.

Since the MPEG2 Systems standard and DVB require that each type of control table be assigned to a separate PID, the PES(s) input to the TS Format Convergence Sublayer which contain the information used to create these tables 132 are demultiplexed within the TS Format Convergence Sublayer by a demultiplexer 138 such that each output stream from the demultiplexer 138 contains all and only the control table sections required by MPEG2 Systems and/or DVB, as appropriate, in the format required by MPEG2 Systems and/or DVB. Each output stream is then passed to the TS Segmentation Layer, wherein the table sections are encapsulated in a sequence of Transport Packets and assigned the PIDs reserved for their use by MPEG2 Systems and/or DVB, and thence to the Multiplexing Sublayer.

The resultant TS is then passed to the network layer of the system across the network service interface 142 m whence it is passed to the decoders and recovered across the network service interface in the decoders 144, exactly as in MPEG2 Systems.

Any TS created by an encoder embodying the present invention is fully conformant with MPEG2 Systems specifications. Accordingly, it can be processed both by decoders that embody the present invention and by decoders that do not embody the present invention. The processing performed by decoders embodying the present invention is illustrated with reference to the right hand side of FIG. 7.

The decoder recovers the TS across the network layer interface 144 and demultiplexes the constituent streams within the TS multiplexing sublayer by PID 145, in conformance with MPEG2 Systems. Within the TS Segmentation Sublayer, the PES Packets, Private Sections, and MPEG2 or DVB Table Sections are recovered from the Transport Packets, in conformance with the specifications of MPEG2 Systems or DVB as appropriate. The resultant streams are then passed to the TS Format Convergence Sublayer.

If the recovered stream is a PES in PES Packet format 146, then no further processing need be applied, and the PES may be passed directly to the Multiplexing Sublayer for further processing as described above.

If the recovered stream is a sequence of MPEG2 Private Sections 148 then the TS Format Convergence Sublayer reformats the Private Sections into Messages for transfer to the Multiplexing Sublayer. The same processing is applied to recovered streams consisting of MPEG2 or DVB Table Sections 150. Each Message Stream is assigned a channel number to identify the associated Data Channel. In addition, the TS Format Convergence Sublayer may optionally combine several of the various recovered message streams into a single MPEG2 Private Stream 152 for transfer to the Multiplexing Sublayer. This process is illustrated in FIG. 7 with particular respect to MPEG2 and DVB Table Sections.

It will be apparent that the processing performed by the TS Format Convergence Sublayer permits MPEG2 PSI Table Sections, DVB SI Table Sections and Private Sections to be represented as PESs. By this means such information can be included in a PS, for example for storage or retrieval purposes. It will further be apparent that a stream of MPEG2 PSI Table Sections and/or DVB SI Table Sections can be passed through an MPEG2 TS as an MPEG2 Private PES, allowing the Tables to be recovered at some remote point, for example in a remultiplexer which extracts several Programs from several input TSs to create a new TS. By this means the MPEG2 PSI Tables and DVB SI Tables required by the remultiplexer can be provided from a remote source without affecting the operation of any of the input TSs. Other applications can be provided using these capabilities, which are not defined or possible using the structures defined by MPEG2 Systems.

The system architecture of the present invention, described in the preceding paragraphs, requires a Message format that has certain particular characteristics:

A Message is completely compatible with a PES Packet and permits all facilities permitted by the PES Packet.

Messages are capable of transporting elementary streams defined by MPEG2 and elementary streams which are not defined by MPEG2.

Messages identify the type of elementary stream carried by the Messages, so that each Message may be delivered to the appropriate Presentation entity in the decoder for processing by means appropriate to the type of elementary stream.

Messages can, if appropriate, identify the Data Channel associated with the Messages, so that multiple Ace Data Channels may be combined into a single MPEG2 Private PES within the Multiplexing Sublayer.

Messages can, if appropriate, include an address identifying the decoder or group of decoders intended to receive the Message.

For Messages carrying data intended to be transported within a TS as Table Sections (e.g. for MPEG2 or DVB Tables or for Private Sections), procedures must be defined to recover the various Sections from the Messages within the TS Format Convergence Sublayer.

The structure of a Message in the preferred embodiment may therefore be defined by reference to an MPEG2 PES Packet, as illustrated in FIGS. 4A and 4B as discussed above.

A Message is an MPEG2 PES Packet. When used in the preferred embodiment to implement the features of the present invention, a Message is specifically formatted as an MPEG2 PES Packet of type Private_stream_1. As noted earlier, the Message comprises a Message Header 180 that is the PES packet header of the Message, and a Message Payload 182 that is the PES packet payload of the Message, each formatted as discussed further below.

The Message Header 180 is defined as having certain specific restrictions with relationship to the general structure of PES Packets defined by the MPEG2 Systems standard, as follows:

The stream_id field has the value OxBD (MPEG2 Private_Stream_1).

The maximum value of the PES_packet_length field is dependent on the type of elementary stream data carried in the Message and is determined on a case by case basis.

The PES_extension_flag is set to '1', indicating that PES extension fields defined by MPEG2 are present. The PES_private_data_flag set to '1', indicating that a PES_private_data( ) extension field 184 is present. The encoding of the PES_private_data( ) field is specified further below.

The Message Header 180 is terminated by at least one stuffing octet, to ensure that a false occurrence of the MPEG2 PES start_code is not accidentally created straddling the boundary of the Message Header 180 and the Message Payload 182. All other fields of the Message Header 180 may be freely encoded as defined by MPEG2 for a PES Packet, and as appropriate for the type of elementary stream data carried in the message.

In order to prevent false occurrences of the MPEG2 PES start_code 0x000001, the contents of all Message Payloads are subjected to a bit-stuffing procedure prior to inclusion in the Message. The procedure defined here for the preferred embodiment is one of many possible such bit-stuffing procedures.

The intended payload is scanned for a sequence of 22 '0' bits. Whenever such a sequence is found, a '1' bit is inserted into the payload immediately following the 22nd '0' bit. If the resultant payload is not an integral number of octets, then the minimum necessary number of '1' bits is appended to the payload to cause the payload to be an integral number of octets. If there have been N bit insertions, then the number of '1' bits to be appended is given by:

Number of '1' bits=(8−N mod 8) mod 8

This procedure has certain consequences for certain fields of the Message Header 180, as follows: The PES_packet_length is calculated after completion of bit-stuffing. The encoder ensures that the PES_packet_length so calculated does not exceed 65535 octets. All decoders of this preferred embodiment may be capable of accepting Messages with a PES_packet_length of at least 4095 octets after bit-stuffing. The actual maximum size of a Message is dependent on the type of elementary stream transported in the Message.

The previous_PES_packet_CRC, if present, is calculated over the contents of the previous Message after bit-stuffing has been performed.

The reverse procedure is performed when extracting a Message Payload 182 from a received Message. The received payload is scanned for a sequence of 22 '0' bits followed by a '1' bit. Whenever such a sequence is found, the '1' bit is discarded, and the count of '0' bits restarted. If the resultant payload is not an integral number of octets, then the minimum number of bits necessary to byte-align the payload is discarded. If there have been N bit removals, then the number of bits to be removed from the end is given by:

Number of discarded trailing bits=(8−N mod 8) mod 8

If a sequence of 23 '0' bits is found in the Message Payload, then the Message contents prior to the start of the sequence are declared invalid and the partial message is discarded.

The structure of the PES_private_data( ) field 184 has the format shown in FIGS. 4A and 4B in the preferred embodiment of the present invention. The 128 bits reserved for the PES_private_data( ) field as defined in the MPEG2 Systems standard is considered as 8 Words each of 16 bits. The bits in each Word are identified by a number from 0 to 15 inclusive, where Bit 0 is the Most Significant Bit (MSB) of the Word, and Bit 15 the Least Significant Bit (LSB) of the Word.

The MSB of each word 186 is denoted the marker_bit. It is set to '1', to ensure that the PES start code is not accidentally emulated in the PES_private_data( ) field. Bits 1 to 15 of the first word 188 constitutes the channel_number field. This field identifies a Data Channel within the MPEG2 Private PES.

Values of the channel-number field in the range 0x0000 to 0x000inclusive are reserved in the preferred embodiment for use by the TS Format Convergence Sublayer of the decoder to prepend Message Headers to payloads which must be processed by the decoder but are delivered through a Transport Stream in a non-PES packet format. The following values are defined at this time:

0x0000: MPEG2 PSI for current Transport Stream (i.e. PID 0, PID 1 and PMT PIDs)

0x0001: DVB SI for current Transport Stream (i.e. PIDs 0x0010–0x0013)

0x0002–0x000F: Reserved.

Values greater than 0x000F may be freely assigned to identify Data Channels by the encoder.

Bits 1 to 15 of the second, third, fourth, and fifth word of the PES_private_data( ) field constitute a 60-bit field called the decoder_identifier 190, which may be used to address a single decoder or a group of decoders embodying the present invention. Each decoder is provided with a unique identifier of this type at manufacture time. Identifiers may be assigned to identify user groups, which may be associated with individual decoders by means of an Address Resolution Protocol. This facility allows services which are otherwise inherently broadcast, such as VBI Data or User Data, to be restricted to a closed user group. In addition, the address 0x0000000000000 is reserved for use as the broadcast address.

With reference to the classical Internet protocol architecture, the decoder_identifier 190 acts as a subnetwork address for a "network" based on MPEG2 PESs. It is therefore formally distinct from the physical address associated with a particular input port, such as the decoder's Ethernet address, with which a different subnetwork protocol will be associated. However, if a port is not otherwise provided with a physical address, the decoder_identifier may act as the port's physical address. It may be bound to a decoder's Internet address via an Address Resolution Protocol.

Bit 1 of the sixth word of the PES_private_data( ) field 192 constitutes the PES_header_removable field. This field identifies whether the Message Header 180 of this Message may be removed when inserting the Message Payload 182 into an MPEG2 TS, or other structure created by a convergence sublayer. (Without loss of generality, only the possibility of an MPEG2 TS will be referred to in subsequent discussion.) If the value of this field is set to '0', then the Message Header 180 is not removed when inserting the Message into a TS. If the value of this field is set to '1', then the Message Header 180 may optionally be removed when the Message is inserted into a TS. The decision to remove the Message Header 180 of a Message with a removable header is made on the basis of criteria that are external to this invention. If the Message Header 180 is removed, then the bit-stuffing process performed on the Message Payload 182 described above is inverted prior to any subsequent processing that may be required. The PES_header_removable bit may be set to '1' on Messages of message_type 0x0000 (MPEG2 PSI) or 0x0001 (DVB SI).

Bits 2–15 of the sixth word of the PES_private_data( ) field 194 constitutes the message_type field. This field identifies the type of elementary stream data carried in the Message Payload 182 of the Message. It is used to select the service access point (SAP) for appropriate processing in the decoder or other downstream module; thus it acts in practice as a conventional Application Protocol Identifier (API). Note that the selection of a message_type does not necessarily carry any implications about the interface across which the data entered the encoder. For example, VBI data could be inserted through a user data port in the encoder, but may be inserted in the VBI lines of the analog video output of a decoder.

The following values are defined for the message_type field in the preferred embodiment:

| | |
|---|---|
| 0x0000 | MPEG2 PSI |
| 0x0001 | DVB SI |
| 0x0002 | Device Management |
| 0x0003 | User data |
| 0x0004 | VBI data |
| 0x0005 | Address Resolution Protocol |
| 0x0006 | Internet Protocol |
| 0x0007–0x3FFF | Reserved |

Other message_type values can include, for example, private data encoded according to the formats of a third party manufacturer.

Messages of the same type (e.g. DVB SI, or VBI data for different lines) may be sent over multiple Data Channels. However, any Data Channel is used to carry Messages of precisely one Message type.

Note that there is nothing in the MPEG2 Systems standard that prevents the structuring of video and audio PES packets as Messages containing channel identification and message typing data as defined by the preferred embodiment of the present invention. However, such an implementation is not recommended. MPEG2 Systems maintain the integrity of the elementary stream as a separate entity down to the message interface, so there is no great advantage to augmenting the MPEG2 PES syntax for video and audio packets. Moreover, MPEG2 Systems provide no means to distinguish users of the pes_private_data( ) field of an MPEG2-defined elementary stream. Different decoders may interpret this field differently, and certain decoders may not accept it at all. For these reasons, channel numbers and message types for video and audio should be retained at most as elementary stream attributes internal to the encoder or decoder.

Bits 1–15 of each of the remaining Words of the PES_private_data( ) field 196 are reserved for uses to be defined.

The permitted formats of the Message Payload 182 vary according to the value of the message_type field. In order to support the functionality required for the TS Format Convergence Sublayer defined above, the preferred embodiment includes definitions of the permitted formats for Messages of message_type 0x0000 (MPEG2 PSI) or 0x0001 (DVB SI). Formats are defined prior to bit-stuffing of the Message Payload 182.

A Message of message_type 0x0000 contains a single MPEG2 PSI section (PAT, PMT, or CAT), as defined by MPEG2 Systems. Network Information Table (NIT) sections are located through the PAT, but are carried in messages of type 0x0001, if the NIT has been defined by DVB, or of a type appropriate to the private syntax, if the NIT has not been defined by DVB.

A Message of message_type 0x0001 contains a single DVB SI section as defined by DVB.

The format of Messages of message_type other than 0x0000 or 0x0001 may be determined on a case by case basis, as each value of message_type is assigned.

In order to permit access to various Data Channels in both a TS and a PS, it is necessary to extend the structures defined by MPEG2 Systems to account for the various elementary stream types supported by the present invention. This is primarily done by defining private descriptors defining the contents of a particular Data Channel. These descriptors can be included in the PMT sections in the TS and in the Program Stream Map (PSM) in the PS.

In the preferred embodiment, message streams conformant to the present invention are identified within PMTs or PSMs by stream_id 0x06 (PES packets containing private data).

Message streams conformant to the present invention may share a TS with one or more MPEG2 Private PESs using a different syntax from the syntax defined in this preferred embodiment. Both streams will be described through descriptors in MPEG2 PSI (and possibly DVB SI). For all parties, the descriptors used will possess a syntax regarded as privately defined within MPEG2 Systems. In order to distinguish the Message streams conformant to the present invention, the associated private descriptors must be distinguished from descriptors appropriate to the other private descriptors by use of an MPEG2 registration_descriptor( ) identifying the syntax as being conformant with the present invention. The appropriate value of a format_identifier attribute of the registration_descriptors can be obtained from the appropriate Registration Authority, as required by MPEG2 Systems.

Since neither MPEG2 Systems nor DVB has defined scoping rules for the registration_descriptor( ), the following rule is assumed in the preferred embodiment of the present invention. The registration_descriptor( ) applies to all subsequent MPEG2 private descriptors encountered within the same loop as the registration_descriptor( ) until the next registration_descriptor( ) encountered within the same loop. MPEG-private descriptors not preceded by a registration_descriptor( ) identifying the syntax as being conformant with the present invention are assumed to have a syntax defined by DVB.

At such time as private descriptors are required within DVB SI for purposes related to the present invention, a value for a private_data_specifier can be Ski obtained from the appropriate Registration Authority. In each descriptor loop within a DVB SI section containing at least one private descriptor related to the present invention, both a registration_descriptor( ), defined by MPEG2 Systems, and a private_data_specifier_descriptor( ), defined by DVB, are supplied preceding the first occurrence of a private descriptor in the loop.

In addition to the registration procedures defined above, each type of private descriptor is identified by a value of the descriptor_tag field. In the preferred embodiment of the present invention, descriptor_tag values are assigned in the range 0xC0-0xFE. An example of the assignment of values of the descriptor_tag field is as follows:

| Descriptor | descriptor_tag value |
|---|---|
| psi_descriptor() | 0xC0 |
| dvb_descriptor() | 0xC1 |
| tup_descriptor() | 0xC2 |
| user_data_descriptor() | 0xC3 |
| vbi_descriptor() | 0xC4 |
| harp_descriptor() | 0xC5 |
| ip_descriptor() | 0xC6 |
| reserved | 0xC7–0xFE |

For the purposes of implementing the TS Format Convergence Sublayer of the present invention, definitions for the psi_descriptor( ) and the dvb_descriptor( ) are required in the preferred embodiment. The psi_descriptor( ) signals the presence of MPEG2 PSI data in a named Data Channel. The dvb_descriptor( ) signals the presence of DVB SI data in a named Data Channel. The format of the psi_descriptor( ) and the dvb_descriptor( ) is shown in FIG. 9.

Bits 0–7 of the first Word 198 constitute the descriptor_tag field as defined by MPEG2 Systems. In the case of the psi_descriptor( ), this field is set to 0XC0 in the preferred embodiment. In the case of the dvb_descriptor( ), this field is set to 0xC1 in the preferred embodiment. Bits 8–15 of the first Word 200 constitute the descriptor_length field as defined by MPEG2 Systems. This field is set to 2 in the preferred embodiment for the psi_descriptor( ) and dvb_descriptor( ). For other descriptor types, the value of the descriptor length field is at least two.

Bit 0 of the second Word 202 is reserved and is set to '1' in the preferred embodiment. Bits 1–15 of the second Word 204 constitute the channel_number field. In the case of the psi_descriptor( ), this field identifies a Data Channel carrying MPEG2 PSI data in the preferred embodiment. In the case of the dvb_descriptor( ), this field identifies a Data Channel carrying DVB SI data in the preferred embodiment.

Descriptor formats for other elementary stream types are defined on a case by case basis.

The present invention permits the construction of encoders capable of accepting a variety of information inputs and creating enhanced MPEG2 Program Streams or Transport Streams, the components of which may optionally be addressed to individual decoders or groups of decoders; transcoders and remultiplexers capable of accepting MPEG2 Program Streams and/or Transport Streams, along with other sources of input, and generating enhanced MPEG2 Program Streams and/or Transport Streams as output; and decoders capable of accepting enhanced MPEG2 Program Streams and/or Transport Streams as input and providing video, audio and a variety of other types of information as output.

The present invention has been described in the context of a packet-based multiplexed communication system that is compatible with the MPEG2 Systems standard. It will be understood, however, that the methods of the present invention are not limited to systems that operate in accordance with the MPEG2 Systems standard. Rather, the present invention may be embodied in any packet-based multiplexed communication system in which it is desirable to combine one or more streams of video, audio, and other data into single or multiple streams suitable for storage or transmission.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a packet-based communication system wherein elementary streams are segmented into packetized elementary stream packets to form packetized elementary streams, a method of providing transport layer services comprising the steps of:

providing a plurality of first elementary streams, including elementary streams of differing type;

segmenting the first elementary streams into messages to form a plurality of first message streams, each message having a common message structure across the differing types of elementary streams;

converting the first message streams into first packetized elementary streams, each first packetized elementary stream associated with a particular first elementary stream;

multiplexing the first packetized elementary streams into an output streams;

providing a plurality of second elementary streams;

segmenting the second elementary streams into messages to form a plurality of second message streams, each second message stream associated with a particular second elementary stream;

associating a data channel identifier with each second message stream;

storing each data channel identifier in a field in its associated message stream;

multiplexing the second message streams into a second packetized elementary stream; and multiplexing the second packetized elementary stream with the first packetized elementary streams.

2. The method of claim 1 wherein the output stream is a Program Stream.

3. The method of claim 1 wherein the output stream is a Transport Stream.

4. The method of claim 1 wherein the output stream is an Asynchronous Transfer Mode Stream.

5. The method of claim 1 wherein the elementary streams include elementary streams which have different data rates.

6. The method of claim 1 wherein each message of certain packetized elementary streams is an MPEG private_stream_1 packetized elementary stream packet comprising a message header and a message payload.

7. In a packet-based communication system wherein elementary streams are segmented into packetized elementary stream packets to form packetized elementary streams, a method of providing transport layer services comprising the steps of:

providing a plurality of first elementary streams, including elementary streams of differing type;

segmenting the first elementary streams into messages to form a plurality of first message streams, each message having a common message structure across the differing types of elementary streams;

converting the first message streams into first packetized elementary streams, each first packetized elementary stream associated with a particular first elementary stream; and multiplexing the first packetized elementary streams into an output stream;

wherein each message of certain packetized elementary streams is an MPEG private_stream_1 packetized elementary stream packet comprising a message header and a message payload wherein the message header includes a private data extension field.

8. The method of claim 7 wherein the private data field includes a channel_number subfield for associating a data channel with the first message stream.

9. The method of claim 7 wherein the private data field includes a decoder_identifier subfield for addressing a decoder.

10. The method of claim 9 wherein the decoder_identifier subfield comprises an Internet protocol subnetwork address.

11. The method of claim 7 wherein the private data field includes a decoder_identifier subfield for addressing a group of decoders.

12. The method of claim 7 wherein the private data field includes a message_type subfield for identifying elementary stream data type carried in the message payload.

13. In a packet-based communication system wherein a plurality of elementary streams are multiplexed to form an output stream for transmission to a remote site, a method of providing transport layer services to the elementary streams comprising the steps of:

segmenting the elementary streams into messages to form a plurality of message streams, each message stream associated with a particular elementary stream;

associating data channel identifiers with certain message streams, each data channel identifier associated with a particular elementary stream and stored in a field in its associated message stream;

multiplexing the certain message streams into a first packetized elementary stream; and converting the remaining message streams into second packetized elementary streams.

14. The method of claim 13 further comprising the step of multiplexing the first and second packetized elementary streams into the output stream.

15. The method of claim 14 wherein the output stream is a Program Stream.

16. The method of claim 14 wherein the output stream is a Transport Stream.

17. The method of claim 16 wherein the step of multiplexing the first and second packetized elementary streams further comprises the steps of:

converting the packetized elementary stream packets of certain second packetized elementary streams into sections;

segmenting the sections and the packetized elementary stream packets of the remaining packetized elementary streams into transport stream packets; and multiplexing the transport stream packets into the transport stream.

18. The method of claim 17 wherein the sections are table sections which include program specific information or service information.

19. The method of claim 17 wherein each message is an MPEG private_stream_1 packetized elementary stream packet comprising a message header and a message payload.

20. The method of claim 19 wherein the message header includes a private data extension field.

21. The method of claim 20 where in the private data field includes a channel_number subfield for associating a data channel with the message stream.

22. The method of claim 20 wherein the private data field includes a decoder_identifier subfield for addressing a decoder.

23. The method of claim 22 wherein the decoder_identifier subfield comprises an Internet protocol subnetwork address.

24. The method of claim 20 wherein the private data field includes a decoder_identifier subfield for addressing a group of decoders.

25. The method of claim 20 wherein the private data field includes a message_type subfield for identifying elementary stream data type carried in the message payload.

26. The method of claim 14 wherein the output stream is an Asynchronous Transfer Mode stream.

27. In a packet-based communication system wherein a plurality of elementary streams are multiplexed to form a transport stream for transmission to a remote site, a method of providing transport layer services to the elementary streams comprising the steps of:

segmenting the elementary streams into messages to form a plurality of message streams, each message stream associated with a particular elementary stream;

associating data channel identifiers with certain message streams, each data channel identifier associated with a particular message stream and stored in a field in the associated message stream;

multiplexing the certain message streams into a private packetized elementary stream;

converting the remaining message streams into second packetized elementary streams; and multiplexing the private and second packetized elementary streams into the transport stream.

28. The method of claim 27 wherein the step of multiplexing the private and second packetized elementary streams further comprises the steps of:

converting packetized elementary stream packets of certain second packetized elementary streams into sections;

segmenting the sections and the packetized elementary stream packets of the remaining packetized elementary streams into transport stream packets; and multiplexing the transport stream packets into the transport stream.

29. The method of claim 28 wherein the sections are table sections which include program specific information or service information.

30. The method of claim 28 wherein the sections are private sections.

31. In a packet-based communication system wherein a plurality of elementary streams are multiplexed to form a transport stream for transmission to a remote site having a decoder, a method of retrieving the elementary streams at the decoder comprising the steps of:

receiving the transport stream at the remote site;

demultiplexing the transport stream into a first packetized elementary stream and second packetized elementary streams;

demultiplexing the first packetized elementary stream into plural first message streams and converting the second packetized elementary streams into second message streams, each message comprising a packetized elementary stream packet;

identifying data channel identifiers associated with the plural first message streams, each data channel identifier associated with a particular first message stream; and reassembling packetized elementary stream packets of the first and second message streams into elementary streams.

32. In a packet-based communication system wherein a plurality of elementary streams are multiplexed to form a transport stream for transmission to a remote site, apparatus for providing transport layer services to the elementary streams comprising:

means for segmenting the elementary streams into messages to form a plurality of message streams, each message stream associated with a particular elementary stream;

means for associating data channel identifiers with certain message streams, each data channel identifier associated with a particular message stream;

means for multiplexing the certain message streams into a private packetized elementary stream;

means for converting the remaining message streams into second packetized elementary streams; and means for multiplexing the private and second packetized elementary streams into the transport stream.

33. In a packet-based communication system wherein elementary streams are segmented into packetized elementary stream packets to form packetized elementary streams, a method of providing transport layer services comprising the steps of:

providing a plurality of first elementary streams;

segmenting the first elementary streams into messages to form a plurality of first message streams;

converting the first message streams into first packetized elementary streams, each first packetized elementary stream associated with a particular first elementary stream; and multiplexing the first packetized elementary streams into a transport stream, wherein the multiplexing step further comprises:

converting the packetized elementary stream packets of certain first packetized elementary streams into sections;

segmenting the sections and the packetized elementary stream packets of the remaining packetized elementary streams into transport stream packets; and multiplexing the transport stream packets into the transport stream.

34. In a packet-based communication system wherein a plurality of elementary streams are multiplexed to form an output stream for transmission to a remote site, a method of providing transport layer services to the elementary streams comprising the steps of:

segmenting the elementary streams into messages to form a plurality of message streams, each message stream associated with a particular elementary stream;

associating data channel identifiers with certain message stream, each data channel identifier associate with a particular message stream and stored in a field in its associated message stream;

multiplexing the certain message streams into a first packetized elementary stream;

converting the remaining message streams into second packetized elementary streams; and multiplexing the first and second packetized elementary streams into the transport stream, the multiplexing further comprising:

converting the packetized elementary stream packets of certain second packetized elementary streams into sections;

segmenting the sections and the packetized elementary stream packets of the remaining packetized elementary streams into transport stream packets; and multiplexing the transport stream packets into the transport stream.

35. In a packet-based communication system wherein a plurality of elementary streams are multiplexed to form a transport stream for transmission to a remote site, a method of providing transport layer services to the elementary streams comprising the steps of:

segmenting the elementary streams into messages to form a plurality of message streams, each message stream associated with a particular elementary stream;

associating data channel identifiers with certain message streams, each data channel identifier associated with a particular message stream;

multiplexing the certain message streams into a private packetized elementary stream;

converting the remaining message streams into second packetized elementary streams; and multiplexing the private and second packetized elementary streams into the transport stream, the multiplexing further comprising:

converting packetized elementary stream packets of certain second packetized elementary streams into sections;

segmenting the sections and the packetized elementary stream packets of the remaining packetized elementary streams into transport stream packets; and multiplexing the transport stream packets into the transport stream.

36. In a packet-based communication system wherein elementary streams are segmented into packetized elementary stream packets to form packetized elementary streams, a method of providing transport layer services comprising the steps of:

providing a plurality of first elementary streams, including elementary streams of differing type;

segmenting the first elementary streams into messages to form a plurality of first message streams, each message having a common message structure across the differing types of elementary streams;

converting the first message streams into first packetized elementary streams, each first packetized elementary stream associated with a particular first elementary stream; and multiplexing the first packetized elementary streams into an output stream, the multiplexing comprising the steps of:

converting the packetized elementary stream packets of certain first packetized elementary streams into sections;

segmenting the sections and the packetized elementary stream packets of the remaining packetized elementary streams into transport stream packets; and multiplexing the transport stream packets into the output stream.

37. The method of claim 36 wherein the output stream is a Program Stream.

38. The method of claim 36 wherein the output stream is a Transport Stream.

39. The method of claim 36 wherein the output stream is an Asynchronous Transfer Mode Stream.

40. The method of claim 36 wherein the certain packetized elementary streams include program specific information or service information.

* * * * *